US009168972B2

(12) United States Patent
Tsai

(10) Patent No.: US 9,168,972 B2
(45) Date of Patent: Oct. 27, 2015

(54) CONTROL DEVICE FOR THE REAR SHOCK ABSORBER OF A BICYCLE

(71) Applicant: Taiwan Hodaka Industrial Co., Ltd., Taipei (TW)

(72) Inventor: Black Tsai, Taipei (TW)

(73) Assignee: Taiwan Hodaka Industrial Co., Ltd., Taipei (TW)

( * ) Notice: Subject to any disclaimer, the term of this patent is extended or adjusted under 35 U.S.C. 154(b) by 57 days.

(21) Appl. No.: 14/146,027

(22) Filed: Jan. 2, 2014

(65) Prior Publication Data

US 2015/0183487 A1 Jul. 2, 2015

(51) Int. Cl.
| | |
|---|---|
| *B62K 25/28* | (2006.01) |
| *F16F 9/06* | (2006.01) |
| *F16F 9/342* | (2006.01) |
| *F16F 9/44* | (2006.01) |
| *B62K 25/04* | (2006.01) |

(52) U.S. Cl.
CPC ............... *B62K 25/28* (2013.01); *F16F 9/062* (2013.01); *F16F 9/342* (2013.01); *F16F 9/44* (2013.01); *B62K 2025/048* (2013.01)

(58) Field of Classification Search
CPC .... B62K 25/28; B62K 25/283; B62K 25/286; B62K 2025/048; F16F 9/06; F16F 9/062; F16F 9/066; F16F 9/067; F16F 9/44; F16F 9/068; F16F 9/34; F16F 9/342; F16F 9/466
USPC ................ 267/64.11, 64.18, 64.22, 64.28
See application file for complete search history.

(56) References Cited

U.S. PATENT DOCUMENTS

| | | | | |
|---|---|---|---|---|
| 5,094,324 | A * | 3/1992 | Tsai ............................... 188/269 |
| 5,181,696 | A * | 1/1993 | Abe ........................... 267/64.17 |
| 8,398,091 | B2 * | 3/2013 | Inoue ................. B60G 17/0157 |
| | | | | 188/266.1 |
| 8,740,237 | B2 * | 6/2014 | McAndrews et al. ......... 280/276 |
| 8,800,729 | B2 * | 8/2014 | Yabe ........................ F16F 9/465 |
| | | | | 188/266.6 |
| 2007/0000743 | A1* | 1/2007 | Naitou et al. ............... 188/322.2 |
| 2007/0252349 | A1* | 11/2007 | Noguchi .......................... 280/5.5 |
| 2010/0044975 | A1* | 2/2010 | Yablon et al. .............. 280/5.503 |
| 2010/0320656 | A1* | 12/2010 | Achenbach ............ B62K 25/04 |
| | | | | 267/64.15 |
| 2011/0147148 | A1* | 6/2011 | Ripa ......................... 188/322.13 |
| 2013/0032979 | A1* | 2/2013 | Ripa .......................... 267/64.26 |

(Continued)

FOREIGN PATENT DOCUMENTS

| | | | | |
|---|---|---|---|---|
| DE | 389828 | * 10/1990 | ................ F16F 9/06 |
| DE | 10260394 B3 | * 6/2004 | ................ F16F 9/46 |

(Continued)

*Primary Examiner* — Anne Marie Boehler
*Assistant Examiner* — Maurice Williams
(74) *Attorney, Agent, or Firm* — Alan D. Kamrath; Kamrath IP Lawfirm, P.A.

(57) ABSTRACT

A control device, for the rear shock absorber of a bicycle, includes a first air chamber, a second air chamber, a third air chamber, an auxiliary air chamber, and a sliding rod. An air piston is arranged inside one of the first, second and third air chambers. However, those air chambers are respectively provided with an air hole communicating with the auxiliary air chamber. The sliding rod is configured with air tight rings, which are arranged top-to-bottom and tightly touch the inner wall of the auxiliary air chamber. Moreover, the sliding rod is provided with grooves between the air tight rings, so that the axially movement of the sliding rod may manage the first, second and third air chambers to be disconnected or to communicate with one other via the grooves to adjust the damping coefficient of the rear shock absorber.

6 Claims, 16 Drawing Sheets

(56) References Cited

U.S. PATENT DOCUMENTS

2013/0168194 A1* 7/2013 Turner et al. .................. 188/269
2015/0034436 A1* 2/2015 McAndrews et al. ......... 188/297

FOREIGN PATENT DOCUMENTS

WO    WO 2007108747 A1 *   9/2007
WO    WO 2012165332 A1 *   12/2012

* cited by examiner

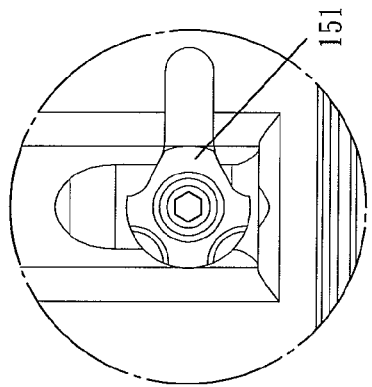
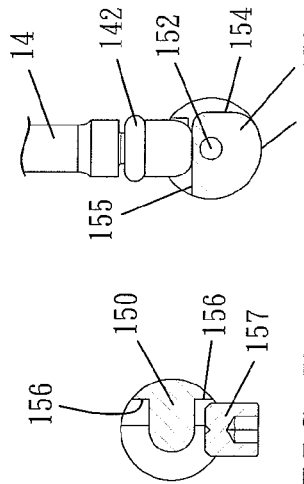
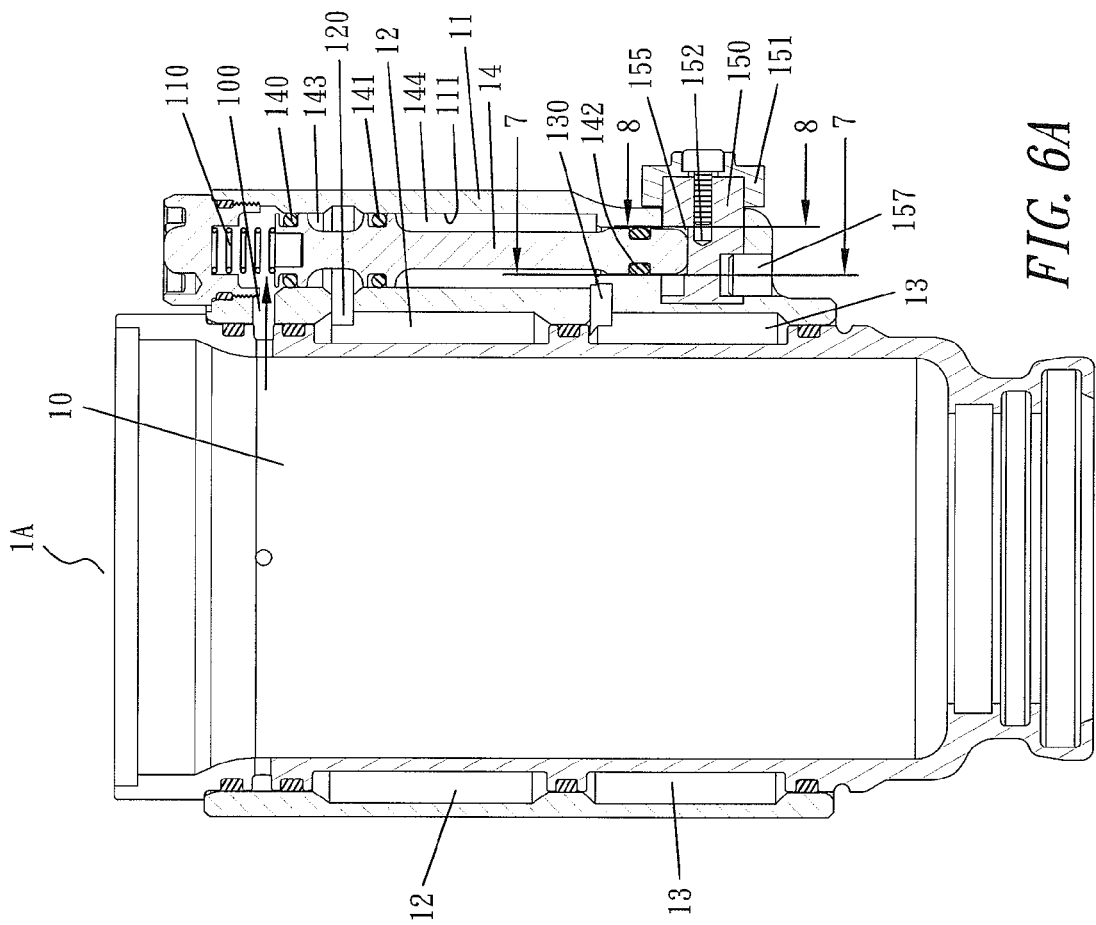
FIG. 6B
FIG. 8
FIG. 7
FIG. 6A

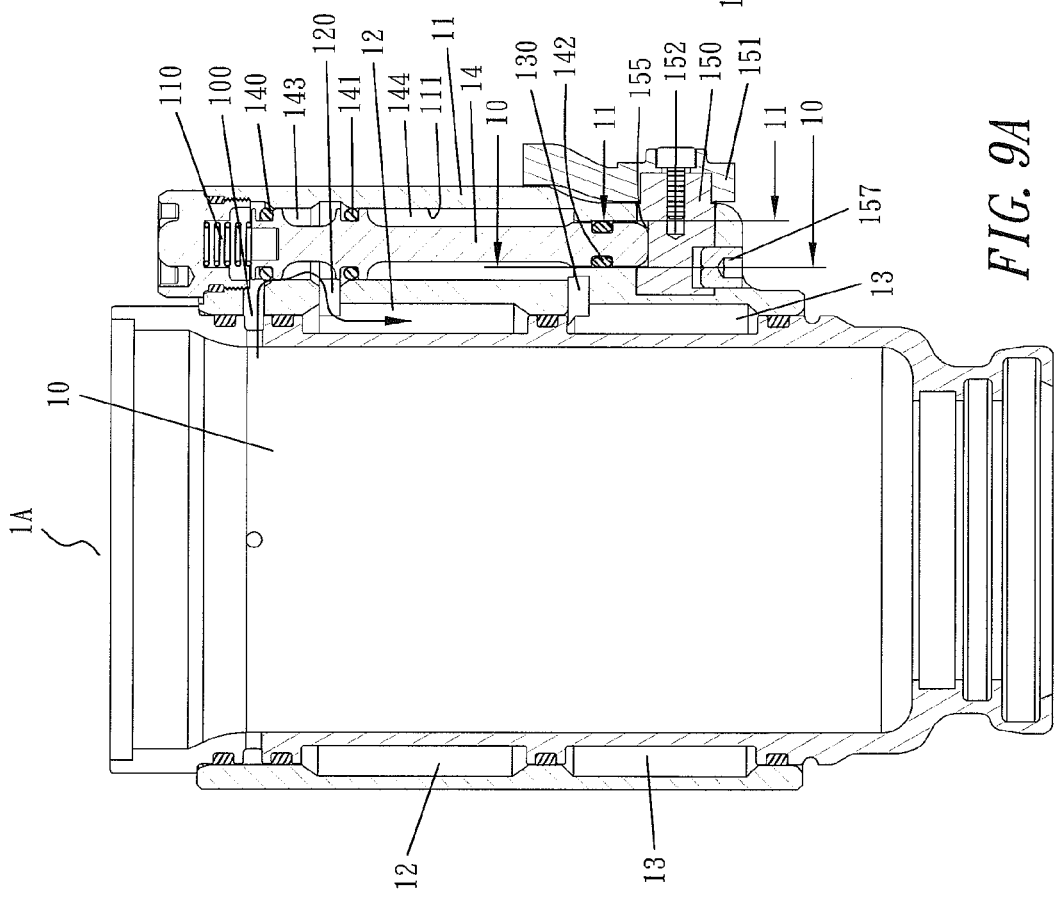
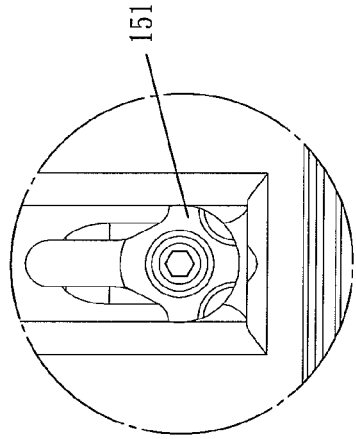
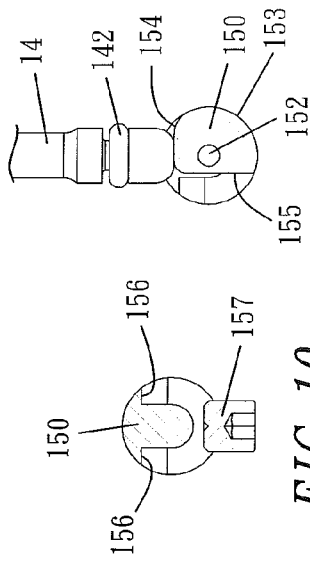
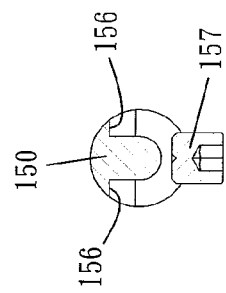

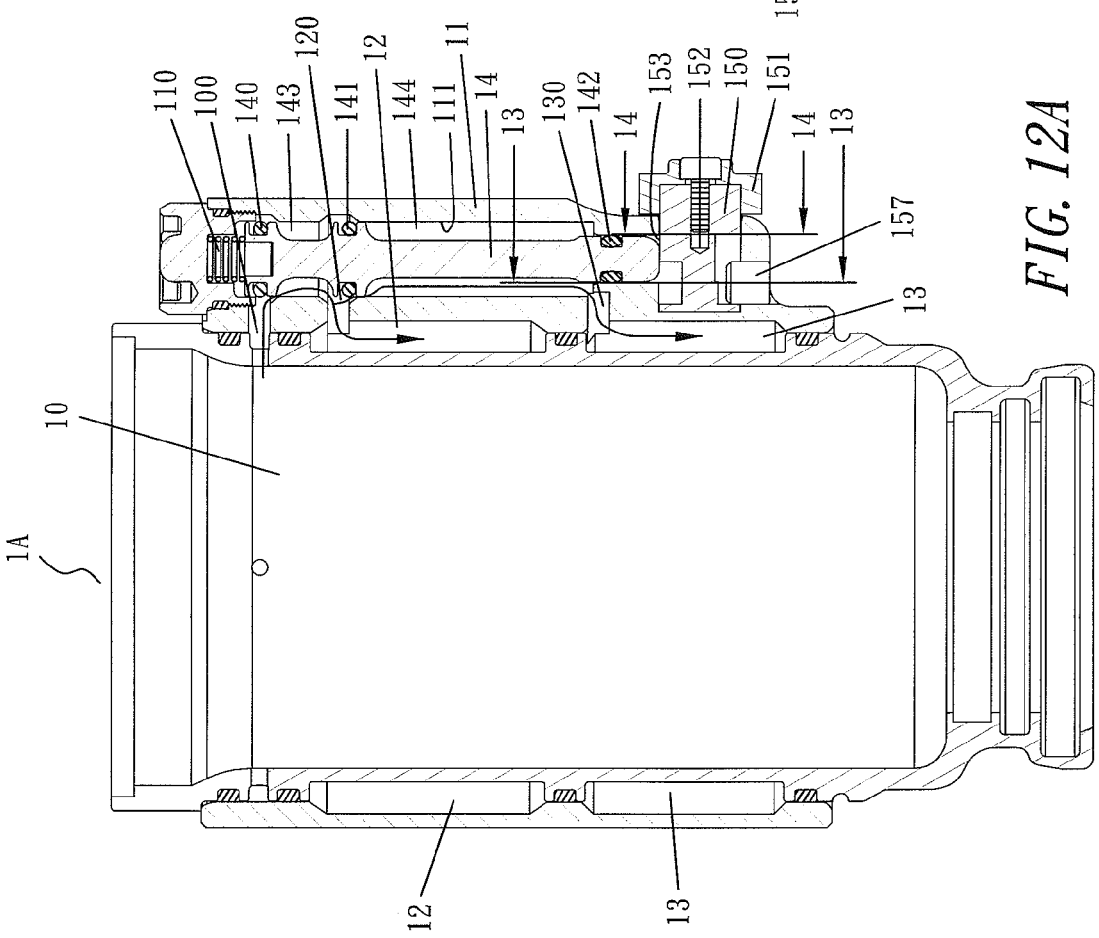

CONTROL DEVICE FOR THE REAR SHOCK ABSORBER OF A BICYCLE

FIELD OF THE INVENTION

The present invention relates to a control device for the rear shock absorber of a bicycle and, more specifically, to a control device for the rear shock absorber of a bicycle that may increase the range of the damping coefficient of said shock absorber and may adjust the strength of shock absorbing according to an individual's weight and bicycle-riding comfort.

DESCRIPTION OF THE PRIOR ART

The bicycle is a sort of transportation, and it is also commonly used to exercise to stay healthy. According to different needs of shock absorbing, a rear shock absorber is disposed to the rear fork of the bicycle. Prior art rear shock absorbers generally are of two types: one is an air shock absorber, and the other is an oil shock absorber. The adjustment of the air pressure damping coefficient of said prior art air shock absorber is on the basis of an individual's weight and bicycle-riding comfort, while the adjustment of the oil pressure damping coefficient of said prior art oil shock absorber is based on road conditions.

The drawback about said prior art air shock absorber and said prior art oil shock absorber is described as follows. The prior art air shock absorber has two types; one is arranged with a single air chamber, and the other is provided with double air chambers. Although the damping coefficient of the single air chamber is adjustable, its damping coefficient in the latter half of the cushion stroke will become higher. Consequently, the efficacy of cushion will be reduced. The damping coefficient of the prior art air shock absorber with double air chambers is fixed. That is, the damping coefficient of the prior art air shock absorber with double air chambers is not adjustable. Moreover, said prior art oil shock absorber can only provide a two-stage shock absorbing adjustment. That is, said prior art oil shock absorber can only full open or full close. According to the aforementioned, said prior art shock absorbers obviously need ameliorating.

SUMMARY OF THE INVENTION

It is against the background and the drawbacks associated therewith that the present invention has been developed.

The objective of the present invention is to provide a control device for the rear shock absorber of a bicycle and, more specifically, a control device for the rear shock absorber of a bicycle that may increase the range of the damping coefficient of said shock absorber. The rear shock absorber disclosed in the present invention is an air shock absorbing unit which comprises at least a first air chamber, a second air chamber, a third air chamber, an air piston rod inserted into one of the aforementioned air chambers, an auxiliary air chamber, and a sliding rod. Said first air chamber is provided with a first air hole communicating with said auxiliary air chamber said second air chamber is provided with a second air hole communicating with said auxiliary air chamber, and said third air chamber is provided with a third air hole communicating with said auxiliary air chamber. Said sliding rod is arranged inside said auxiliary air chamber, and the surfaces of said sliding rod are respectively configured with a first air tight ring, a second air tight ring and a third air tight ring which are protruding and allowed to tightly touch the inner wall of said auxiliary air chamber. Moreover, a first groove is formed between said first air tight ring and said second air tight ring, and said first groove may manage said first and second air chambers to be disconnected or to communicate with each other by the axially movement of the aforementioned sliding rod. A second groove is formed between said second air tight ring and said third air tight ring, and said second groove may manage said second and third air chambers to be disconnected or to communicate with each other by the axially movement of the aforementioned sliding rod. In addition, the damping coefficient of the rear shock absorber is able to be adjusted by managing the air chambers of said rear shock absorber to be disconnected or to communicate with one other.

An alternative shock absorbing unit disclosed in the present invention is an oil shock absorbing unit including an oil chamber having an end fastened to the aforesaid air piston, and an oil piston disposed inside said oil chamber and partitioning said oil chamber into a first oil chamber and a second oil chamber. Said oil chamber is arranged with a shaft rod extending axially and inserting into said oil piston. Said oil piston is arranged with a first through hole, a second through hole and a third through hole arranged on concentric circles. The first through hole is nearest to the center, the third through hole is the furthest from the center, and the second through hole is between the first and third through holes. Moreover, said shaft rod relative to the bottom surface of said oil piston is configured with a small valve plate and a large valve plate. Said small valve plate is pushed by a large spring producing more force to block said first through hole of said oil piston, and said large valve plate is pushed by the force of a small spring to block said second through hole of said oil piston. Meantime said third through hole is not blocked by any valve plate. Said shaft rod is managed by a control device of a cam mechanism to adjust its position of axial movement, so that said shaft rod may overcome the spring forces from the large and small springs to drive said large and small valve plates to move to adjust said first through hole and said second through hole to close or to open. Thus, the damping coefficient of said oil shock absorbing unit is adjusted.

BRIEF DESCRIPTION OF THE DRAWINGS

In order that the present invention may be more fully understood, preferred embodiments thereof will now be described with reference to the accompanying drawings, in which:

FIG. 6A is a sectional view showing the air shock absorbing unit in a state of full close according to the preferred embodiment of the present invention.

FIG. 6B shows the position of the air pressure adjusting button of the air shock absorbing unit in a state of full close according to the preferred embodiment of the present invention.

FIG. 7 is a sectional view of 7-7 shown in FIG. 6A.

FIG. 8 is a sectional view of 8-8 shown in FIG. 6A.

FIG. 9A is a sectional view showing the air shock absorbing unit in a state of half open according to the preferred embodiment of the present invention.

FIG. 9B shows the position of the air pressure adjusting button of the air shock absorbing unit in a state of half open according to the preferred embodiment of the present invention.

FIG. 10 is a sectional view of 10-10 shown in FIG. 9A.

FIG. 11 is a sectional view of 11-11 shown in FIG. 9A.

FIG. 12A is a sectional view showing the air shock absorbing unit in a state of full open according to the preferred embodiment of the present invention.

FIG. 12B shows the position of the air pressure adjusting button of the air shock absorbing unit in a state of full open according to the preferred embodiment of the present invention.

FIG. 13 is a sectional view of 13-13 shown in FIG. 12A.

FIG. 14 is a sectional view of 14-14 shown in FIG. 12A.

DESCRIPTION OF THE PREFERRED EMBODIMENTS

The means for achieving the aforesaid objective and the functions of the present invention will become apparent from the following description, taken in connection with the accompanying drawings, wherein preferred embodiments of the present invention are disclosed.

Figure 1:
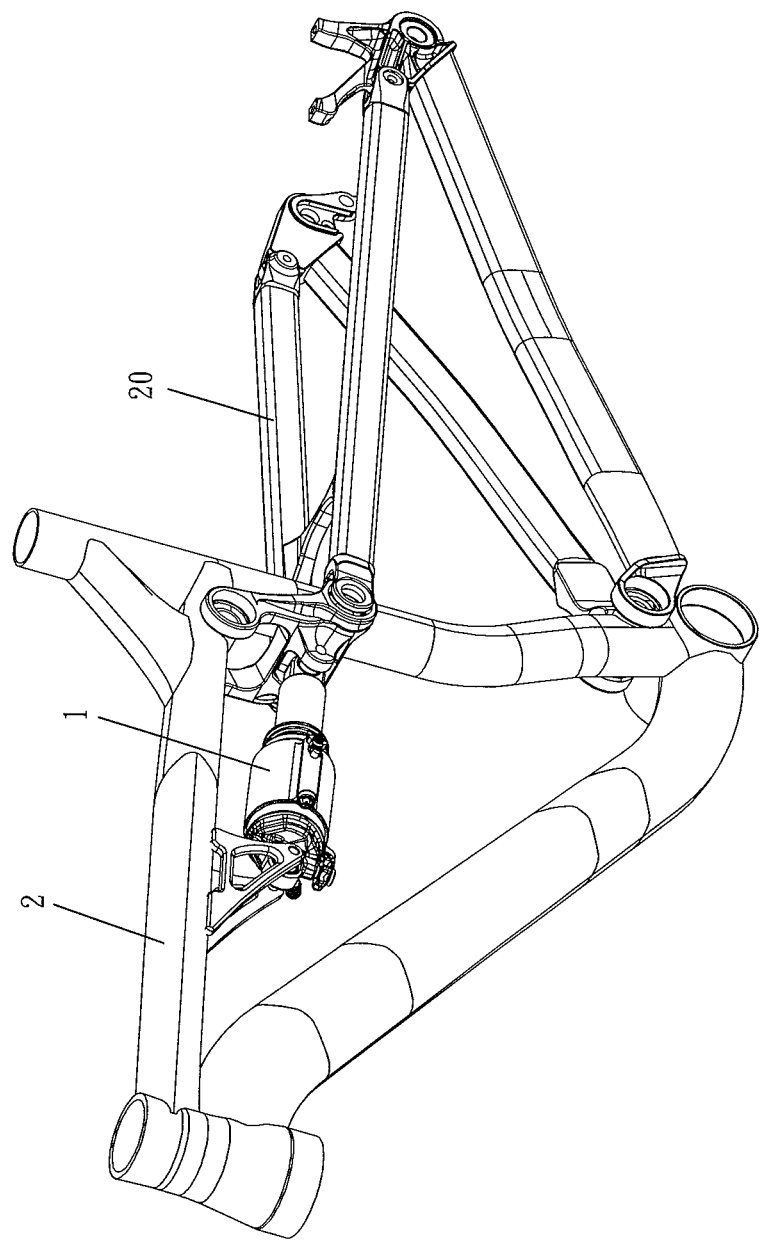
FIG. 1 is a stereogram of the rear shock absorber combined with the bicycle frame according to the preferred embodiment of the present invention.
Figure 2:
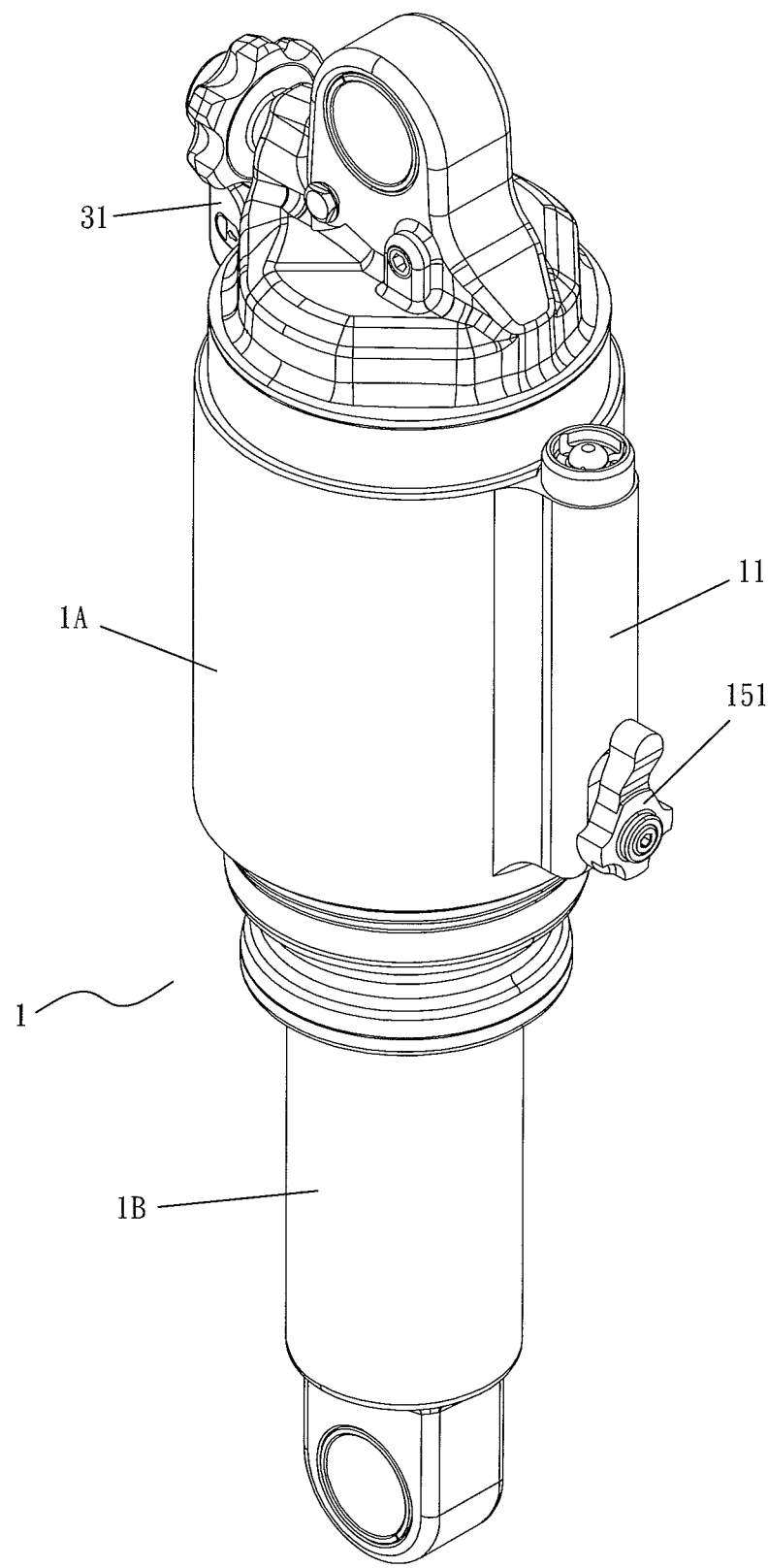
FIG. 2 is a stereogram of the rear shock absorber according to the preferred embodiment of the present invention.
Figure 3:
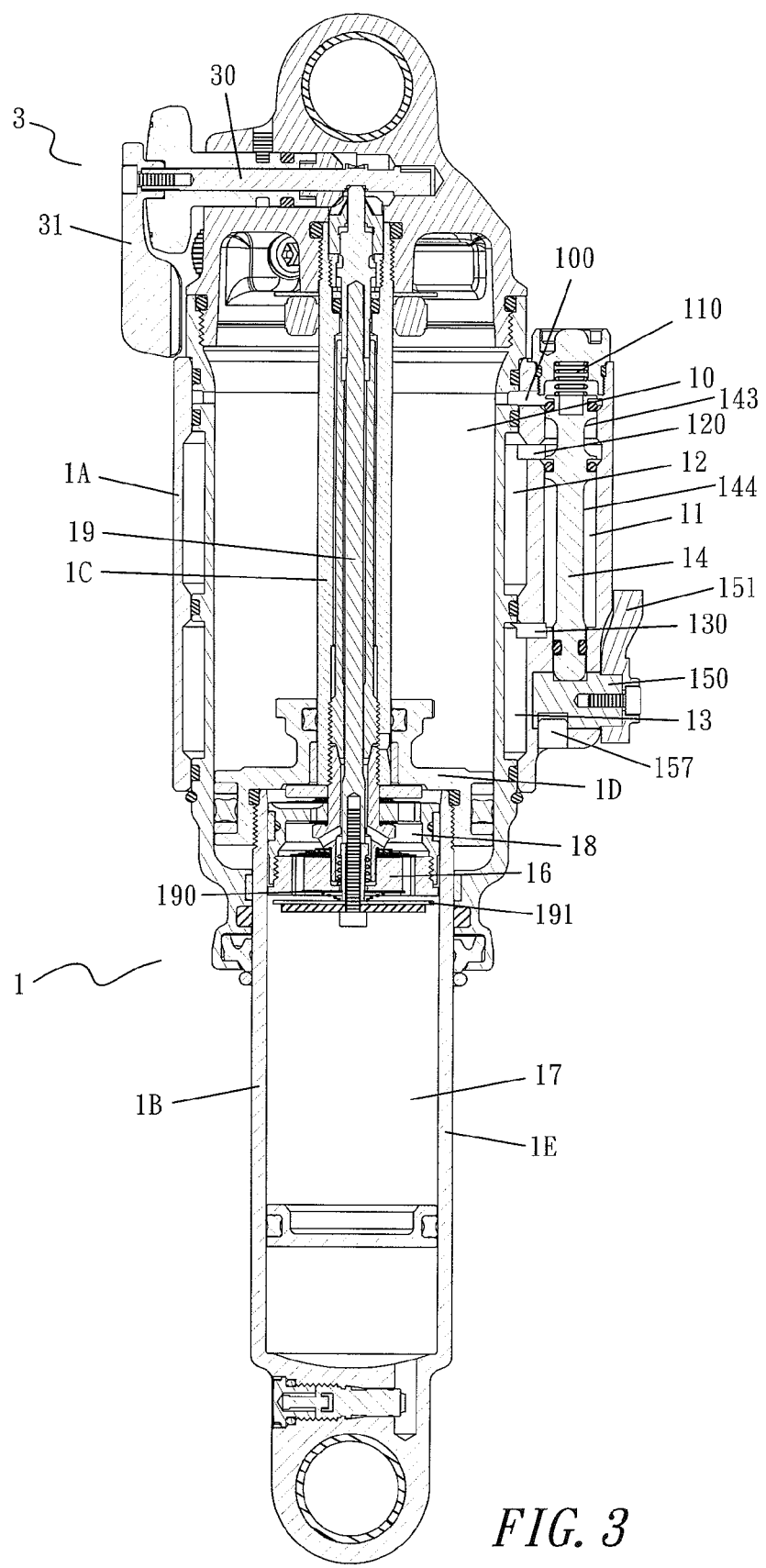
FIG. 3 is a sectional view of the rear shock absorber according to the preferred embodiment of the present invention.
Figure 4:
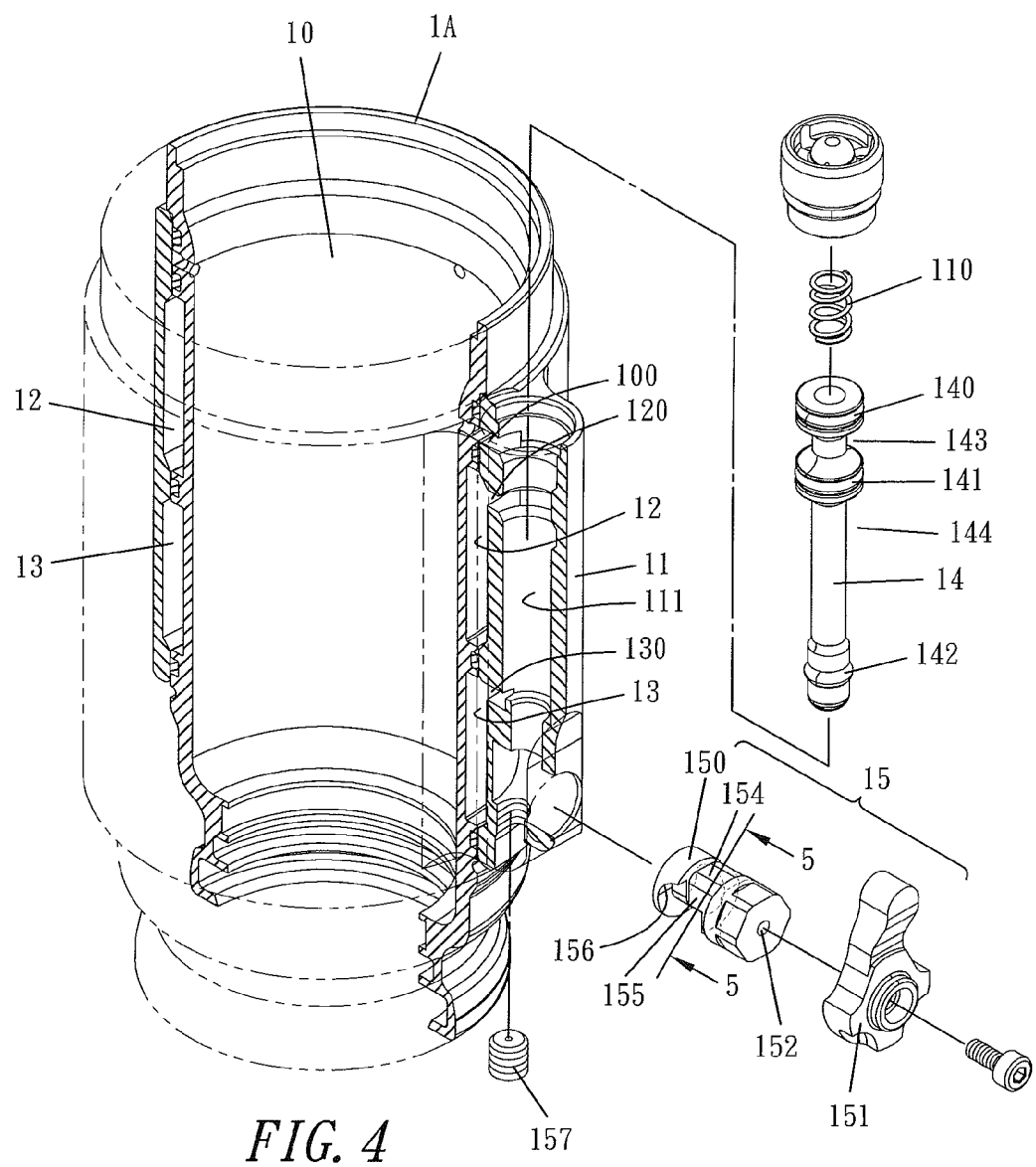
FIG. 4 is a breakdown drawing of the air shock absorbing unit according to the preferred embodiment of the present invention.

Referring to FIG. 1, FIG. 2 and FIG. 3, two ends of said rear shock absorber 1 are connected with a bicycle frame 2 and a rear fork 20. Said rear shock absorber 1 comprises an air shock absorbing unit 1A and an oil shock absorbing unit 1B, and both of which may be arranged respectively or be disposed together. As illustrated in FIG. 3, FIG. 4 and FIG. 6A, said rear shock absorber 1, of which the interior is filled with air, such as nitrogen, includes an auxiliary air chamber 11, which is hollow.

A first air chamber 10 is arranged with a first air hole 100 communicating with said auxiliary air chamber 11, and the interior of which is disposed with an air piston rod 1C having an air piston 1D, as shown in FIG. 3.

A second air chamber 12 is configured to the outer side of said first air chamber 10, and is provided with a second air hole 120 communicating with said auxiliary air chamber 11.

A third air chamber 13 is configured to the outer side of said first air chamber 10 and located under said second air chamber 12, and is provided with a third air hole 130 communicating with said auxiliary air chamber 11.

A sliding rod 14 is disposed inside the auxiliary air chamber 11, and has a top end connected with a spring 110 which is arranged at the upper end inside the auxiliary air chamber 11 and which may push said sliding rod 14 to move downward. The face of said sliding rod 14 is provided with a first air tight ring 140, a second air tight ring 141 and a third air tight ring 142, which are arranged top-to-bottom m and allowed to tightly touch the inner wall 111 of said auxiliary air chamber 11. As shown in FIG. 3, FIG. 4 and FIG. 6A, a first groove 143 is arranged between said first air tight ring 140 and said second air tight ring 141 on the surface of said sliding rod 14, so that said first air chamber 10 and said second air chamber 12 may communicate with each other or be disconnected by the axial movement of said sliding rod 14. Moreover, a second groove 144 is arranged between said second air tight ring 141 and said third air tight ring 142 on the surface of said sliding rod 14, so that said second air chamber 12 and said third air chamber 13 may communicate with each other or be disconnected by the axial movement of said sliding rod 14.

Figure 5:
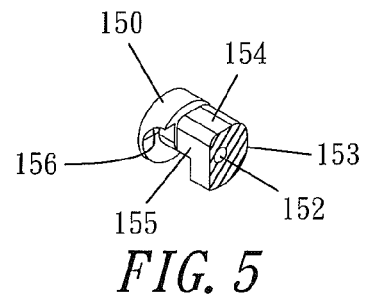
FIG. 5 is a sectional view of 5-5 shown in FIG. 4.

An adjusting unit 15, as shown in FIG. 4, includes a cam 150 and an air pressure adjusting button 151. Said air pressure adjusting button 151 is fastened to the axle core 152 of said cam 150 to rotate as a whole. Said cam 150 is inserted into the lower portion inside said auxiliary air chamber 11 and touched by the bottom end of said sliding rod 14. Moreover, a first wall-surface 153, a second wall-surface 154 and a third wall-surface 155 are configured in order on the external wall of said cam 150 relative to the touched position, as shown in FIG. 5. Said first wall-surface 153 is the furthest from the axle core 152 in radial distance, and said third wall-surface 155 is the nearest to the axle core 152 in radial distance. Moreover, in the radial distance to the axle core 152, said second wall-surface is between said first wall-surface 153 and said third wall-surface 155. The aforesaid radial distance setting correlates with the spacing distance of the aforementioned first, second and third air holes 100, 120, 130, and also correlates with the length of said first groove 143 and said second groove 144. Moreover, the outer side of said first wall-surface 153 and the outer side of said third wall-surface 155 are respectively provided with a stop wall 156, and the bottom end of said auxiliary air chamber 11 is disposed with a stop piece 157 relative to said stop wall 156 to limit the maximum of turning when said cam 150 is turned rightward or leftward.

FIG. 3 and FIG. 5 illustrate the completely assembled air shock absorbing unit 1A. When the damping coefficient needs to be augmented up to the maximum, said air pressure adjusting button 151 needs to be adjusted to actuate said cam 150 to turn, so that said third wall-surface 155 of said cam 150, which is the nearest to the axle core 152 in radial distance, may correspond to said sliding rod 14. Thus, said sliding rod 14 is pushed to move axially downward by said spring 110, as shown in FIG. 6A and FIG. 8.

Moreover, said first groove 143 and said second groove 144 disconnect said second air chamber 12 and said third air chamber 13. Meantime, the air-flowing space inside said first air chamber 10 is the smallest, so that the damping coefficient resulting from the motion of said air piston rod 1C is the highest, and so that said air pressure adjusting button 151 is in a state of full close, as shown in FIG. 6B.

FIG. 9A to FIG. 11 illustrate said air shock absorbing unit 1A in a state of half open. Said air pressure adjusting button 151 is adjusted to actuate said cam 150 to turn, so that said second wall-surface 154 of said cam 150 may face the bottom end of said sliding rod 14 to enable said spring 110 to push said sliding rod 14 to move axially, as shown in FIG. 9A. Meantime, said first groove 143 of said sliding rod 14 is allowed to communicate with said first air hole 100 and said second air hole 120 to connect said first air chamber 10 with said second air chamber 12. Thus, the air-flowing space is enlarged, and, consequently, the damping coefficient resulting from the motion of said air piston rod 1C is reduced.

FIG. 12A to FIG. 14 illustrate said air shock absorbing unit 1A in a state of full open. Said air pressure adjusting button 151 is adjusted to actuate said cam 150 to turn, so that said first wall-surface 153 of said cam 150 is allowed to face the bottom end of said sliding rod 14 to enable said spring 110 to push said sliding rod 14 to move axially, as shown in FIG. 12A. Meantime, said first groove 143 of said sliding rod 14 is allowed to communicate with said first air hole 100 and said second air hole 120 to connect said first air chamber 10 with said second air chamber 12, and said second groove 144 is allowed to communicate with said second air hole 120 and said third air hole 130 to connect said second air chamber 12 with said third air chamber 13. Thus, the three air chambers are in a state of intercommunication, and the air-flowing space becomes the largest, so that the damping coefficient resulting from the motion of said air piston rod 1C is the lowest.

In addition, when said air shock absorbing unit 1A is in a state of full open or in a state of full close, and when said cam 150 is turned to the limited position, said stop wall 156 will be barricaded by said stop piece 157 to stop, as shown in FIG. 7 and FIG. 13. Accordingly, it becomes more accurate when the damping coefficient needs to be adjusted.

Figure 15:
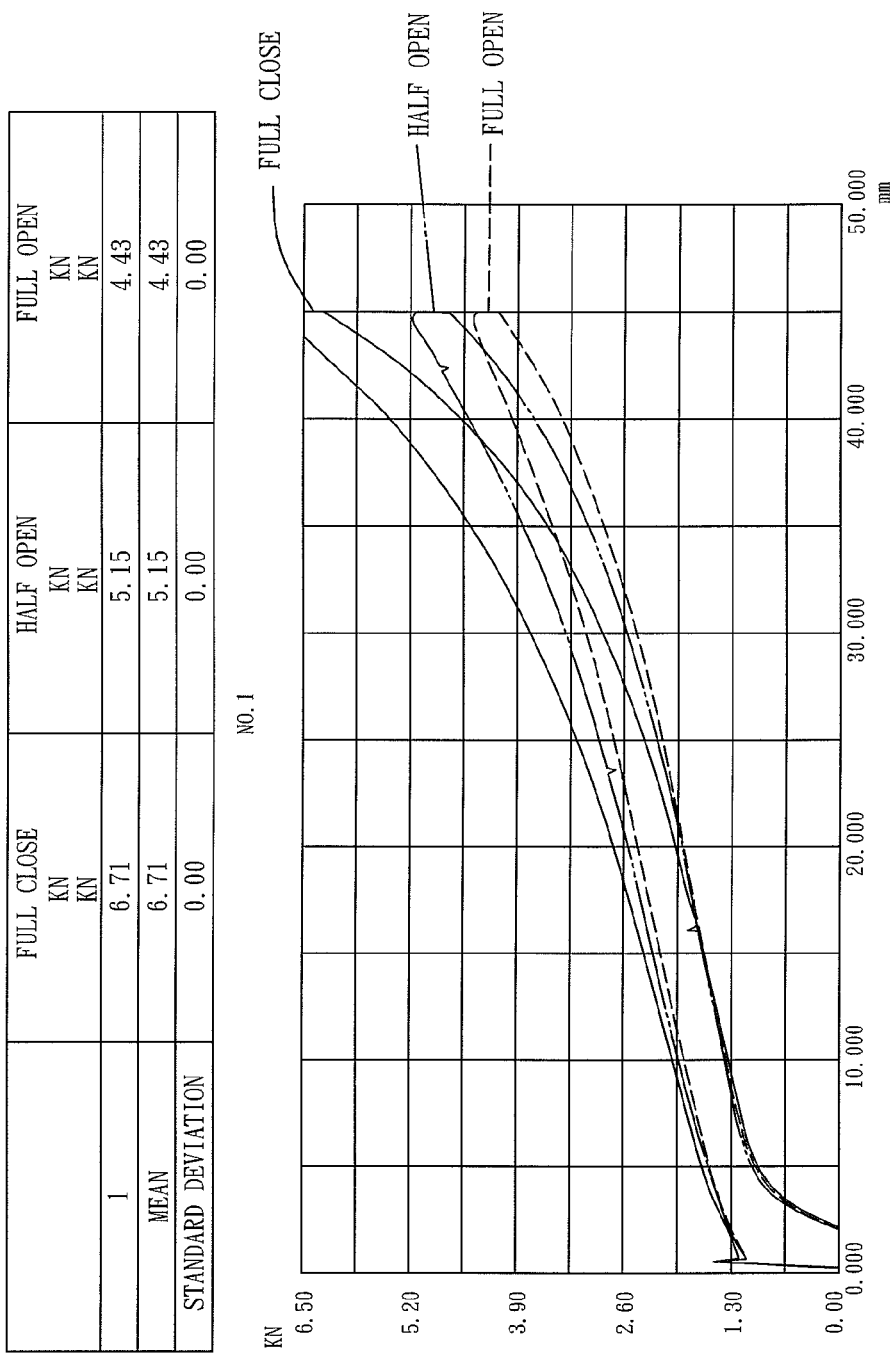
FIG. 15 is a curve graph showing the damping coefficient test data of the air shock absorbing unit according to the preferred embodiment of the present invention.

FIG. 15 illustrates the damping coefficient curves that the air shock absorbing unit 1A disclosed in the present invention is in a state of full close, half open and full open. According to the curve in a state of full open, said air shock absorbing unit 1 A is allowed to increase the range of the damping coefficient.

Referring to FIG. 3 and FIG. 16 to FIG. 19, the oil chamber 1E of said oil shock absorbing unit 1B has a top end fastened to the bottom end of the air piston 1D of said air shock absorbing unit 1A to allow them to move together. Said oil chamber 1E is partitioned into a first oil chamber 17 and a second oil chamber 18 by an oil piston 16 arranged with a shaft rod 19 in the middle, and said shaft rod 19 is controlled by a control device 3 of a cam mechanism to enable said shaft rod 19 to move axially.

Figure 18:
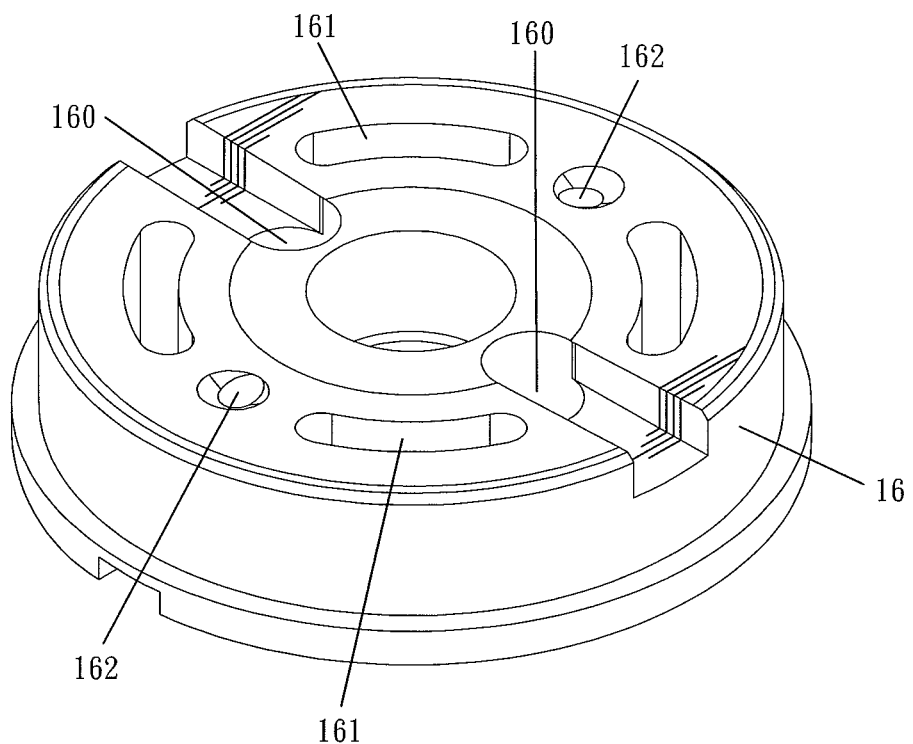
FIG. 18 is a second stereogram of the oil piston arranged to the oil shock absorbing unit according to the preferred embodiment of the present invention.

According to the aforementioned, the bottom surface of said oil piston 16 is arranged with a first through hole 160, a second through hole 161 and a third through hole 162 which are arranged on concentric circles and are allowed to axially pass through said oil piston 16. The first through hole 160 is the nearest to the center, the third through hole 162 is the furthest from the center, and the second through hole 161 is between the first through hole 160 and the third through hole 162. The outer wall of said oil piston 16 bottom surface relative to said third through hole 162 is disposed with a lateral hole 163 connecting to said third through hole 162, as shown in FIG. 18. Moreover, the bottom end of said shaft rod 19, relative to the position inserting through said oil piston 16, is configured with a small valve plate 190 and a large valve plate 191 which are arranged top-to-bottom. Said small valve plate 190 is controlled by a large spring 1900 producing more force to block said first through hole 160 of said oil piston 16, and said large valve plate 191 is controlled by a small spring 1910 producing less force to block said second through hole 161 of said oil piston 16.

Said control device 3 includes a rod member 30 and an oil pressure adjusting button 31. Said oil pressure adjusting button 31 is fastened to said rod member 30, so that they are allowed to turn together as a whole. Said rod member 30 is arranged with an axle core 300. The surface of said rod member 30 relative to the top end of said shaft rod 19 is provided with a first wall 32, a second wall 33 and a third wall 34. Said first wall 32 is the nearest to said axle core 300 in a radial distance, said second wall 33 is less near said axle core 300 in a radial distance, and said third wall 34 is the furthest from the axle core 300 in a radial distance. Said oil pressure adjusting button 31 may actuate one wall of said rod member 30 to touch the top end of said shaft rod 19. Moreover, the outer side of said first wall 32 and the outer side of said third wall 34 are respectively provided with a stop wall 35, as shown in FIG. 19.

Figure 16:
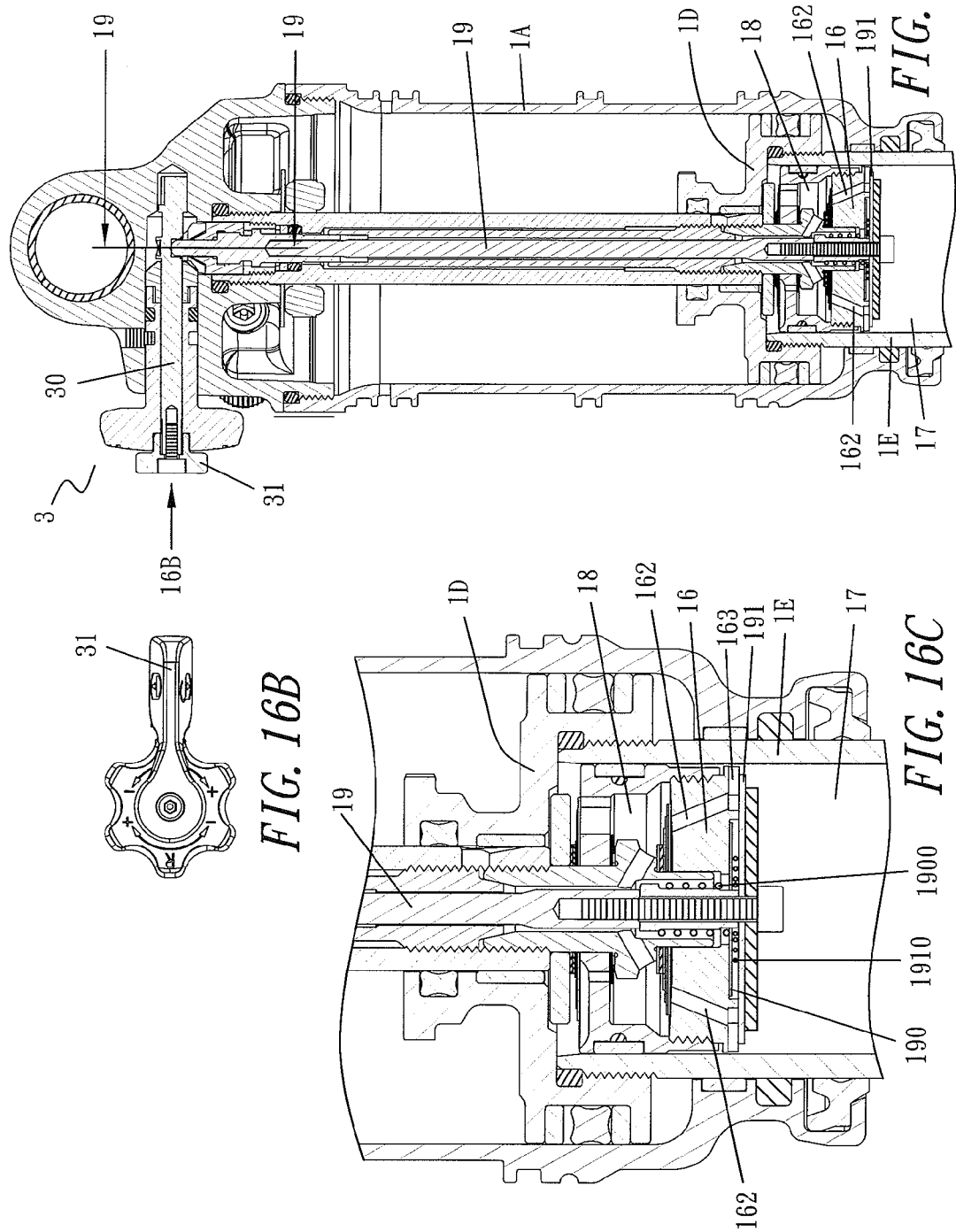
FIG. 16A is a sectional view showing the oil shock absorbing unit in a state of full close according to the preferred embodiment of the present invention.
FIG. 16B shows the position of the oil pressure adjusting button of the oil shock absorbing unit in a state of full close according to the preferred embodiment of the present invention.
FIG. 16C is a partial enlarged drawing of FIG. 16A.
Figure 17:
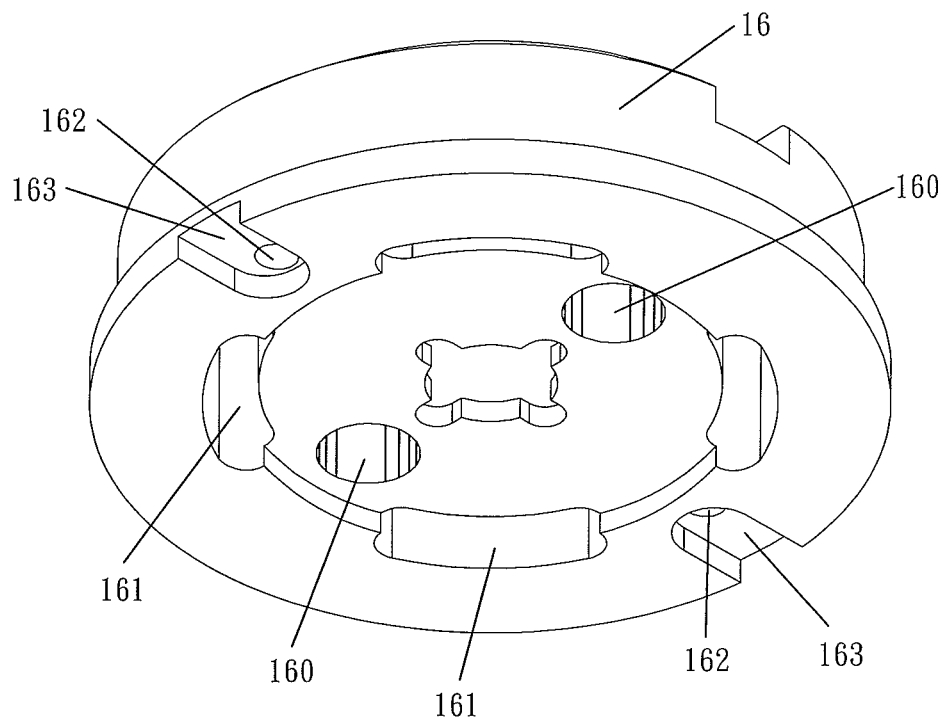
FIG. 17 is a first stereogram of the oil piston arranged to the oil shock absorbing unit according to the preferred embodiment of the present invention.
Figure 19:
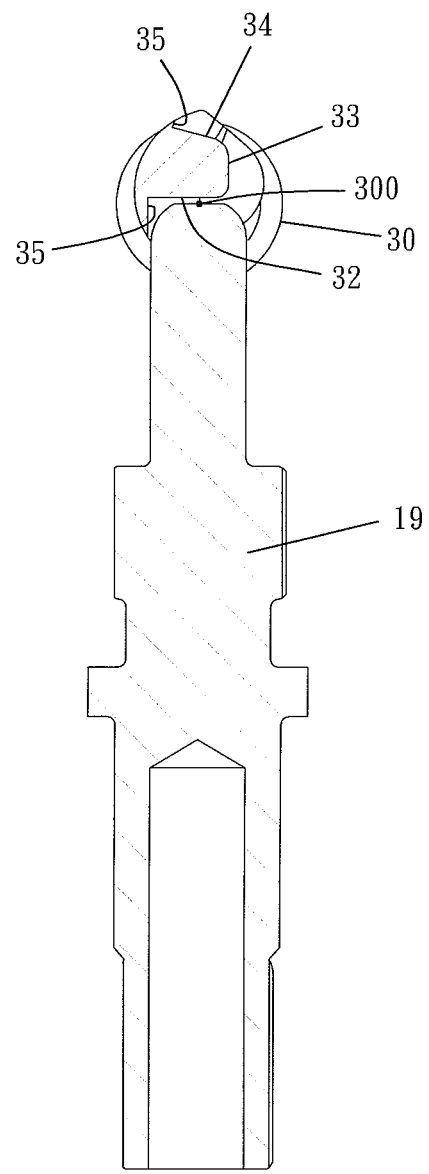
FIG. 19 is a sectional view of 19-19 shown in FIG. 16A.

FIG. 16 and FIG. 19 illustrate said oil shock absorbing unit 1B in a state of full close. Said oil pressure adjusting button 31 is adjusted to actuate said rod member 30 to turn, so that said first wall 32 of said rod member 30 is allowed to face the top end of said shaft rod 19, as shown in FIG. 19. Meantime, said large valve plate 191 and said small valve plate 190 are controlled by said large spring 1900 and said small spring 1910 to block said second through hole 161 and said first through hole 160 which are configured to said oil piston 16 so that the oil between said first oil chamber 17 and said second oil chamber 18 may only pass through via said third through hole 162 of said oil piston 16. Thus, the damping coefficient resulting from the motion of said oil shock absorbing unit 1B is the highest.

Figure 20:
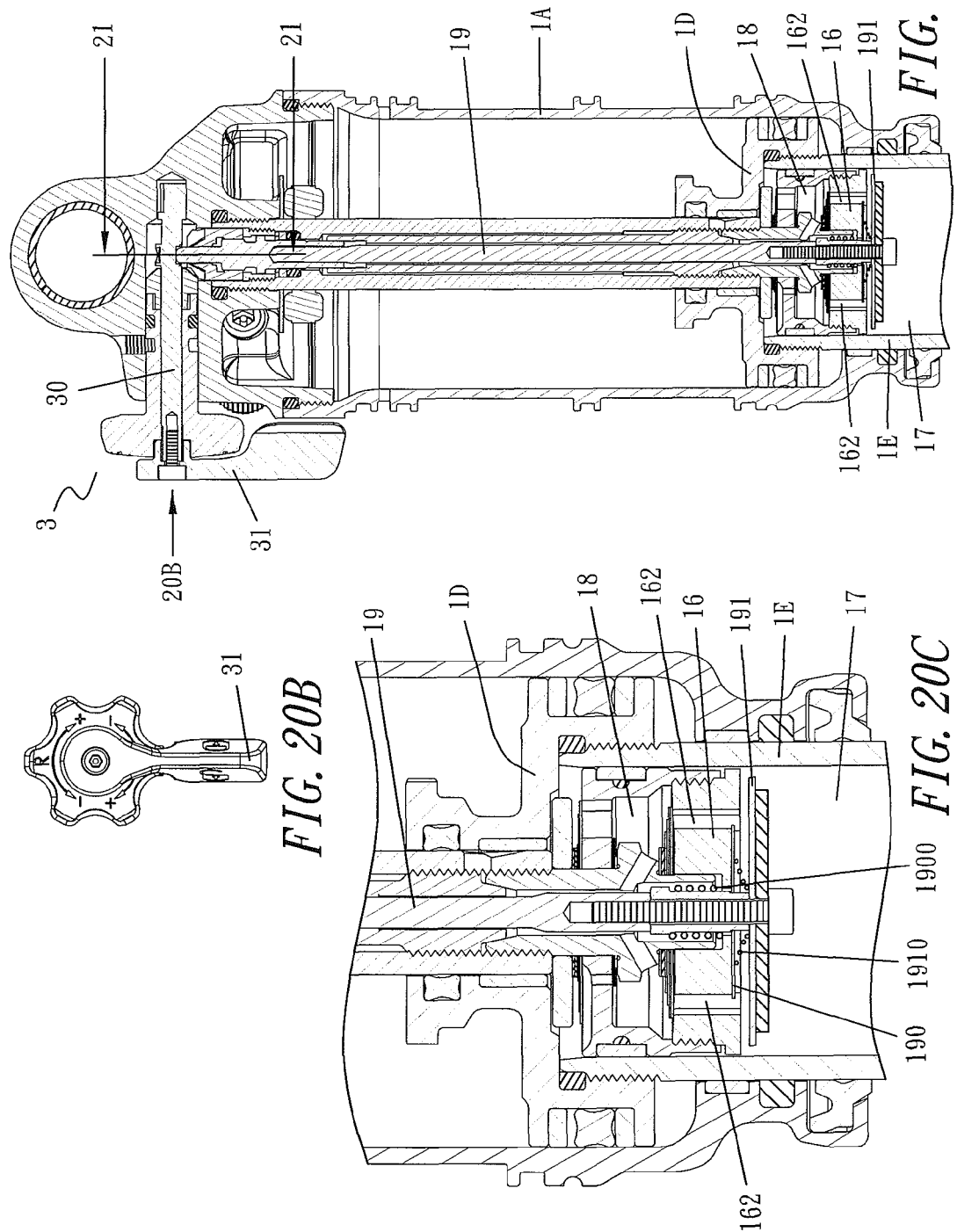
FIG. 20A is a sectional view showing the oil shock absorbing unit in a state of half open according to the preferred embodiment of the present invention.
FIG. 20B shows the position of the oil pressure adjusting button of the oil shock absorbing unit in a state of half open according to the preferred embodiment of the present invention.
FIG. 20C is a partial enlarged drawing of FIG. 20A.
Figure 21:
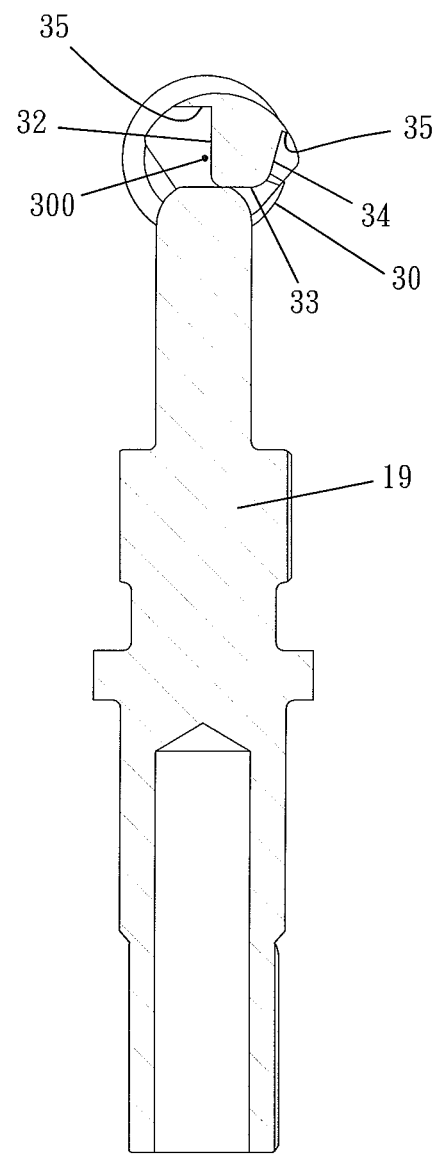
FIG. 21 is a sectional view of 21-21 shown in FIG. 20A.

FIG. 20 to FIG. 21 illustrate said oil shock absorbing unit 1B in a state of half open. Said oil pressure adjusting button 31 is adjusted to actuate said rod member 30 to be simultaneously turned, so that said second wall 33 of said rod member 30 is allowed to face the top end of said shaft rod 19, as shown in FIG. 21, to drive said shaft rod 19 to move axially simultaneously. Meantime, said shaft rod 19 overcomes the force from said small spring 1910 to drive said large valve plate 191 to move axially simultaneously to enable said large valve plate 191 to be away from the bottom surface of said oil piston 16, so that said second through hole 161 of said oil piston 16 is no longer blocked. However, said small valve plate 190 is still controlled by said large spring 1900 to block said first through hole 160. Therefore, said third through hole 162 and said second through hole 161 arranged to said oil piston 16 are full open, so that the oil is allowed to pass through via said through holes 162 and 161. Thus, the damping coefficient resulting from the motion of said oil shock absorbing unit 1B is medium.

Figure 22:
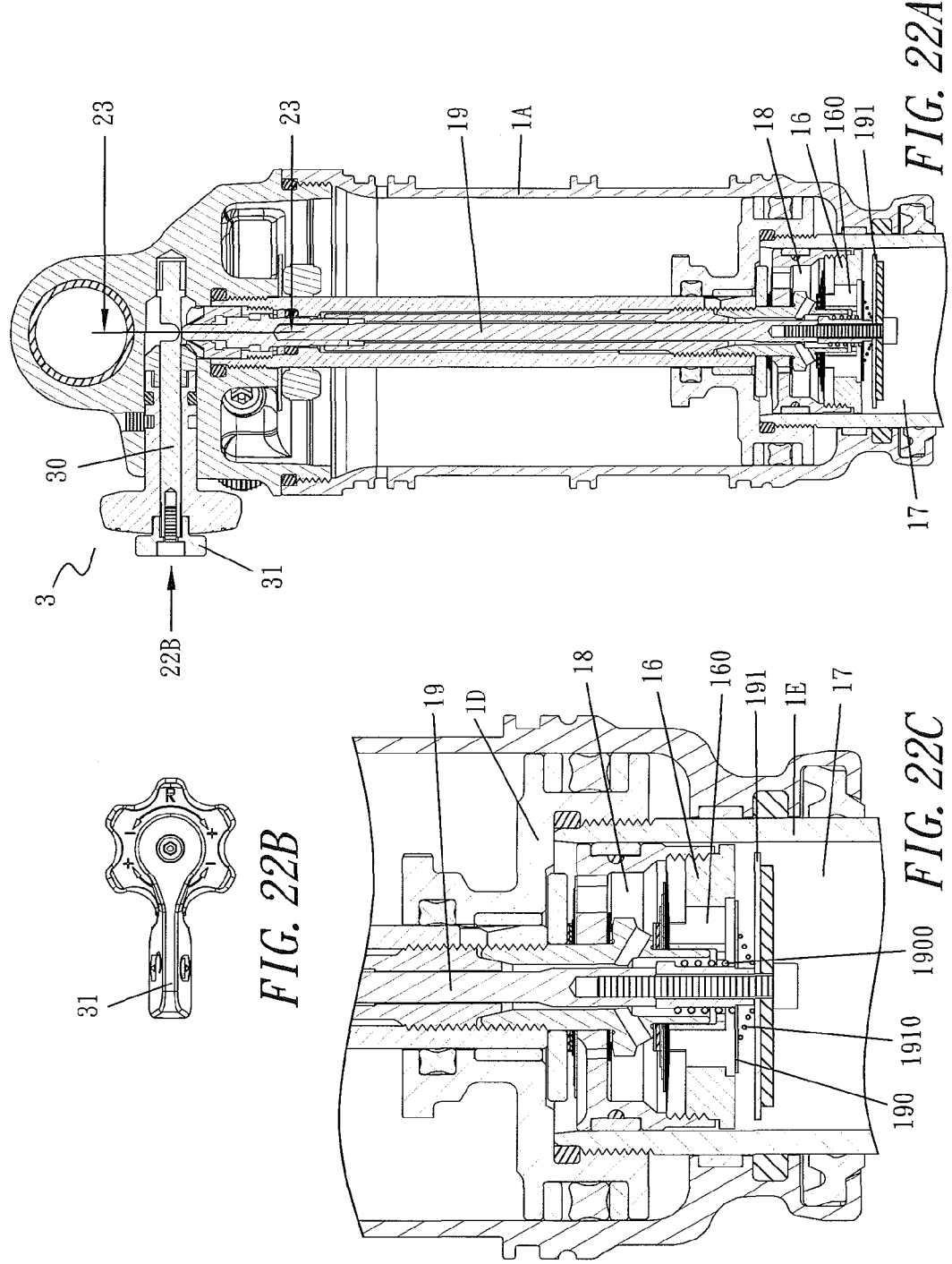
FIG. 22A is a sectional view showing the oil shock absorbing unit in a state of full open according to the preferred embodiment of the present invention.
FIG. 22B shows the position of the oil pressure adjusting button of the oil shock absorbing unit in a state of full open according to the preferred embodiment of the present invention.
FIG. 22C is a partial enlarged drawing of FIG. 22A.
Figure 23:
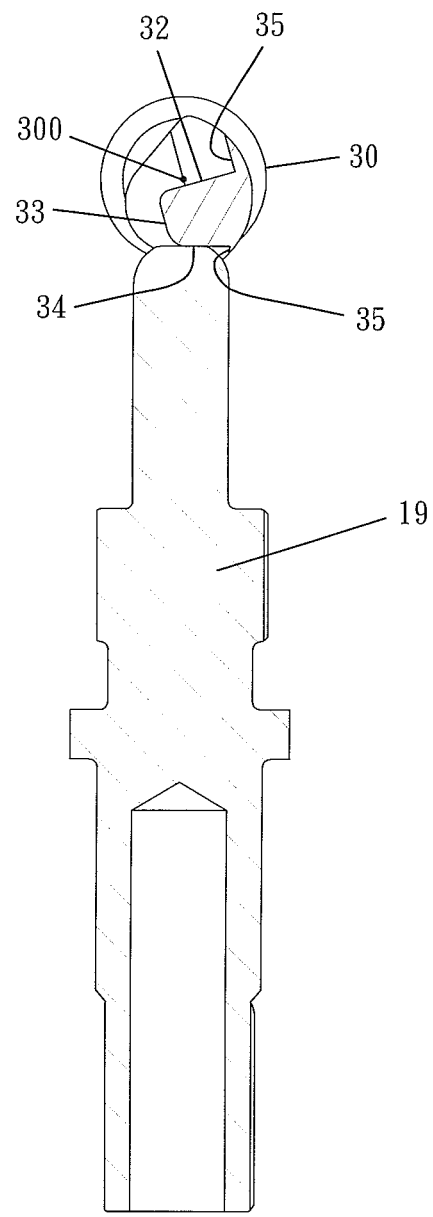
FIG. 23 is a sectional view of 23-23 shown in FIG. 22A.

FIG. 22 to FIG. 23 illustrate said oil shock absorbing unit 1B in a state of full open. Said oil pressure adjusting button 31 is adjusted to actuate said rod member 30 to be simultaneously turned, so that said third wall 34 of said rod member 30 is allowed to face the top end of said shaft rod 19, as shown in FIG. 23, to drive said shaft rod 19 to move axially simultaneously. Meantime, said large valve plate 191 and said small valve plate 190 are driven by said shaft rod 19 to overcome the forces from said large spring 1900 and said small spring 1910 simultaneously to enable said large valve plate 191 and said small valve plate 190 to be away from the bottom surface of said oil piston 16, so that all said first through hole 160, said second through hole 161 and said third through hole 162 configured to said oil piston 16 are full open, and the total caliber that the oil may pass through said oil piston 16 is the largest. Thus, the damping coefficient resulting from the motion of said oil shock absorbing unit 1B is the lowest.

Figure 24:
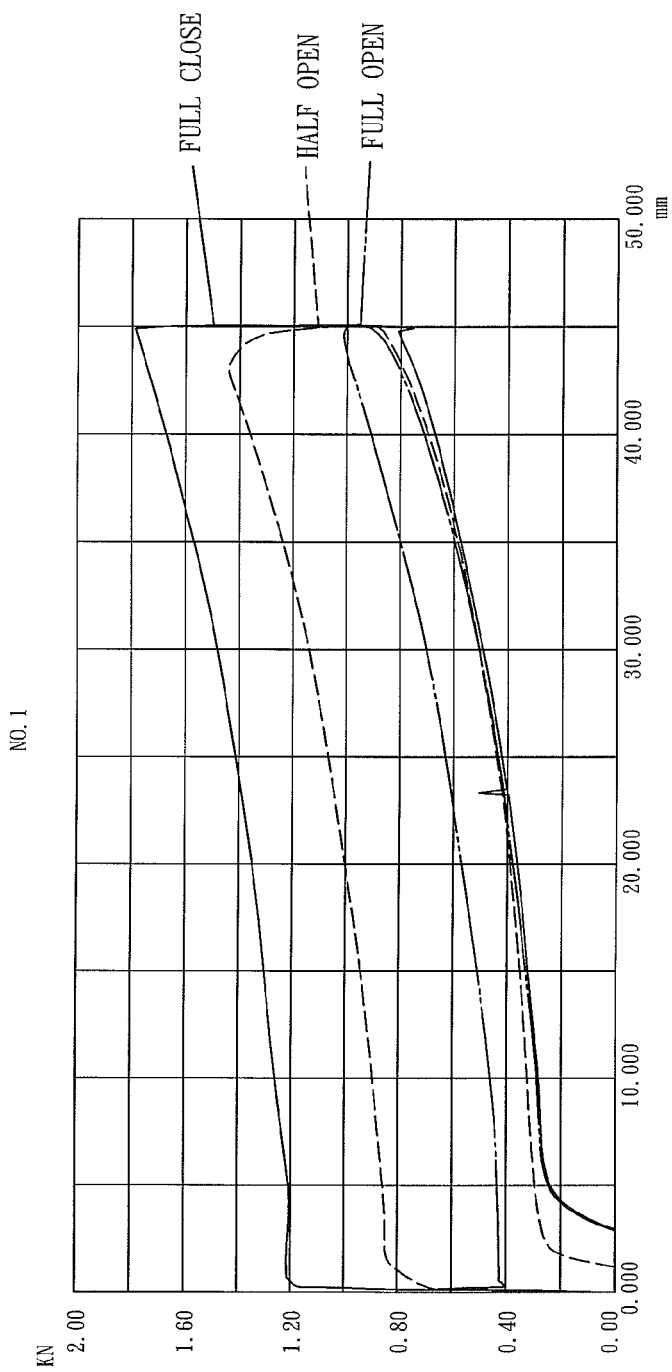
FIG. 24 is a curve graph showing the damping coefficient test data of the oil shock absorbing unit according to the preferred embodiment of the present invention.

FIG. 24 illustrates the damping coefficient curves that the oil shock absorbing unit 1B disclosed in the present invention is in a state of full close, half open and full open. According to the curve in a state of full open, said oil shock absorbing unit 1B is allowed to increase the range of the damping coefficient.

That is, both of the air shock absorbing unit 1A and the oil shock absorbing unit 1B disclosed in this present invention provide a function that the range of the damping coefficient is allowed to be increased. In addition, the present invention may offer more choices of damping coefficient adjustment according to an individual's weight and road conditions, and comparing with the prior art rear shock absorber, the present invention is more progressive.

What is claimed is:

1. A control device for a rear shock absorber of a bicycle, comprising: at least a first air chamber, a second air chamber, a third air chamber, an auxiliary air chamber, and a sliding rod;
wherein:
an interior of said first air chamber is filled with air;
said first air chamber has an air piston arranged with a first air hole communicating with said auxiliary air chamber;
an interior of said second air chamber is filled with air;
said second air chamber is arranged with a second air hole communicating with said auxiliary air chamber;
an interior of said third air chamber is filled with air;
said third air chamber is arranged with a third air hole communicating with said auxiliary air chamber;
said sliding rod is disposed inside said auxiliary air chamber and is provided with a first air tight ring, a second air tight ring and a third air tight ring arranged top-to-bottom;
said first, second and third air tight rings tightly touch an inner wall of said auxiliary air chamber;
a first groove is formed between said first air tight ring and said second air tight ring;
a second groove is formed between said second air tight ring and said third air tight ring;
said sliding rod is controlled by an adjusting unit to move axially in said auxiliary air chamber;
said first groove manages said first and second air chambers to be disconnected or to communicate with each other by the axial movement of said sliding rod;
said second groove manages said second and third air chambers to be disconnected or to communicate with each other by the axial movement of said sliding rod to adjust a damping coefficient of said air piston;
said air piston fastened to one end of an oil chamber of an oil shock absorbing unit;
said oil chamber, partitioned into a first oil chamber and a second oil chamber by an oil piston, is arranged with a shaft rod extending axially and inserted into said oil piston;
said oil piston is arranged with a first through hole, a second through hole and a third through hole;
said shaft rod relative to the bottom surface of said oil piston is configured with a small valve plate and a large valve plate;
said small valve plate is pushed by the force of a large spring to block said first through hole of said oil piston;
said large valve plate is pushed by the force of a small spring to block said second through hole of said oil pistons;
said third through hole is not blocked by any valve plate; and
said shaft rod is managed by a control device of a cam mechanism to adjust a position of axial movement with said shaft rod overcoming the spring forces from the large and small springs to drive said large and small valve plates to move to adjust said first through hole and said second through hole to close or to open, with the damping coefficient of said oil shock absorbing unit being adjusted.

2. The control device for the rear shock absorber of a bicycle as claimed in claim 1, wherein:
said control device includes a rod member and an oil pressure adjusting button fastened to said rod member;
said oil pressure adjusting button drives said rod member to turn together as a whole;
a surface of said rod member is touched by an end of said shaft rod;
said rod member surface, at a position touched by said shaft rod, is provided with at least a first wall, a second wall and a third wall;
in a radial distance, said first wall is nearest to said axle core of said rod member, and said third wall is furthest from the axle core of said rod member;
in the radial distance to the axle core of said rod member, said second wall is between said first wall and said third wall;
said shaft rod is pushed by said first, second and third walls of said rod member, which are in different radial distances, to adjust a position of axial movement of said shaft rod; and
an outer side of said first wall and an outer side of said third wall are respectively provided with a stop wall touching one side of said shaft rod to limit the maximum of turning when said rod member turns rightward or leftward.

3. The control device for the rear shock absorber of a bicycle as claimed in claim 2, wherein:
said adjusting unit includes a cam and an air pressure adjusting button fastened to an axle core of said cam;
said cam has an external wall touched by said sliding rod;
a first wall-surface, a second wall-surface and a third wall-surface are configured on the external wall of said cam relative to the touched position;
in a radial distance, said first wall-surface is furthest from the axle core of said cam, and said third wall-surface is nearest to the axle core of said cam;
in the radial distance to the axle core of said cam, said second wall-surface is between said first wall-surface and said third wall-surface;
the outer side of said first wall-surface and the outer side of said third wall-surface are respectively provided with a stop wall;
said auxiliary air chamber is disposed with a stop piece relative to said stop wall to limit the maximum of turning when said cam is turned;
said sliding rod is pushed by a sliding rod spring with the end of said sliding rod touching said first wall-surface of said cam to enable said first groove and said second groove to disconnect said first, second and third air chambers.

4. The control device for the rear shock absorber of a bicycle as claimed in claim 1, wherein two ends of said rear shock absorber are respectively connected with a bicycle frame and a rear fork.

5. The control device for the rear shock absorber of a bicycle as claimed in claim 1, wherein the first through hole is nearest to a center of the oil piston rod, wherein the third through hole is furthest from the center of the oil piston rod, and wherein the second through hole is between the first and third through holes.

6. A control device for a rear shock absorber of a bicycle, comprising: at least a first air chamber, a second air chamber, a third air chamber, an auxiliary air chamber, and a sliding rod;

wherein:

an interior of said first air chamber is filled with air;

said first air chamber has an air piston arranged with a first air hole communicating with said auxiliary air chamber;

an interior of said second air chamber is filled with air;

said second air chamber is arranged with a second air hole communicating with said auxiliary air chamber;

an interior of said third air chamber is filled with air;

said third air chamber is arranged with a third air hole communicating with said auxiliary air chamber;

said sliding rod is disposed inside said auxiliary air chamber and is provided with a first air tight ring, a second air tight ring and a third air tight ring arranged top-to-bottom;

said first, second and third air tight rings tightly touch an inner wall of said auxiliary air chamber;

a first groove is formed between said first air tight ring and said second air tight ring;

a second groove is formed between said second air tight ring and said third air tight ring;

said sliding rod is controlled by an adjusting unit to move axially in said auxiliary air chamber;

said first groove manages said first and second air chambers to be disconnected or to communicate with each other by the axial movement of said sliding rod;

said second groove manages said second and third air chambers to be disconnected or to communicate with each other by the axial movement of said sliding rod to adjust a damping coefficient of said air piston;

said adjusting unit includes a earn and an air pressure adjusting button fastened to an axle core of said cam;

said cam has an external wall touched by said sliding rod;

a first wall-surface, a second wall-surface and a third wall-surface are configured on the external wall of said cam relative to the touched position;

in a radial distance, said first wall-surface is furthest from the axle core of said cam, and said third wall-surface is nearest to the axle core of said cam;

in the radial distance to the axle core of said cam, said second wall-surface is between said first wall-surface and said third wall-surface;

the outer side of said first wall-surface and the outer side of said third wall-surface are respectively provided with a stop wall;

said auxiliary air chamber is disposed with a stop piece relative to said stop wall to limit the maximum of turning when said cam is turned; and said sliding rod is pushed by a sliding rod spring with the end of said sliding rod touching said first wall-surface of said cam to enable said first groove and said second groove to disconnect said first, second and third air chambers.

* * * * *